United States Patent [19]

Pailles et al.

[11] Patent Number: 5,530,755
[45] Date of Patent: Jun. 25, 1996

[54] SECURED APPARATUS AND PROCESS FOR SECURING THE TRANSMISSION OF DOCUMENTS BY FAX AND GRAPHIC CODE FOR THE AUTHENTICATION OF AN IMAGE

[75] Inventors: Jean-Claude Pailles, Epron; Olivier Lepetit, Caen; Isabelle Milet, Baron sur Odon, all of France

[73] Assignees: France Telecom, Paris; La Poste, Boulogne Billancourt Cedex, both of France

[21] Appl. No.: 291,397

[22] Filed: Aug. 16, 1994

[30] Foreign Application Priority Data

Aug. 18, 1993 [FR] France .................. 93 10076

[51] Int. Cl.⁶ .................................... H04N 1/44
[52] U.S. Cl. ............................ 380/18; 380/23
[58] Field of Search ......................... 380/18, 23

[56] References Cited

U.S. PATENT DOCUMENTS

| | | |
|---|---|---|
| 4,900,902 | 2/1990 | Sakakibara . |
| 4,956,863 | 9/1990 | Goss ............................ 380/18 |
| 5,231,663 | 7/1993 | Earl et al. ...................... 380/18 |
| 5,321,749 | 6/1994 | Virga ............................ 380/18 |

FOREIGN PATENT DOCUMENTS

| | | |
|---|---|---|
| 0161181 | 11/1985 | European Pat. Off. . |
| 0532381 | 3/1993 | European Pat. Off. . |
| 0542703 | 5/1993 | European Pat. Off. . |
| 2660135 | 9/1991 | France . |

*Primary Examiner*—David C. Cain
*Attorney, Agent, or Firm*—Pearne, Gordon, McCoy & Granger

[57] ABSTRACT

The invention relates to a secured apparatus for the transmission of documents by facsimile or fax, which comprises on the emitter side a securing module placing in the binary file transmitted and representing the document a graphic signature of the "morse" type placed on a page of the document and including on the recipient side a module for decoding and checking the graphic signature. The invention also relates to a process for securing the transmission of documents by fax and an image authentication graphic code.

24 Claims, 1 Drawing Sheet

FIG. 1
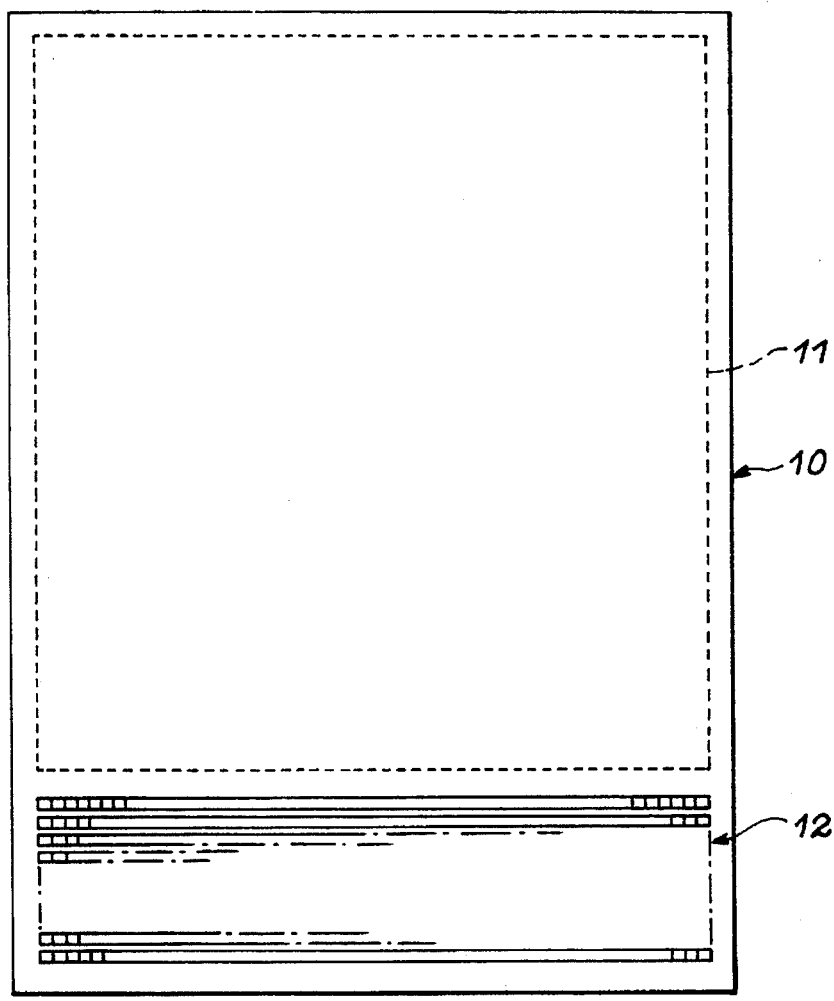
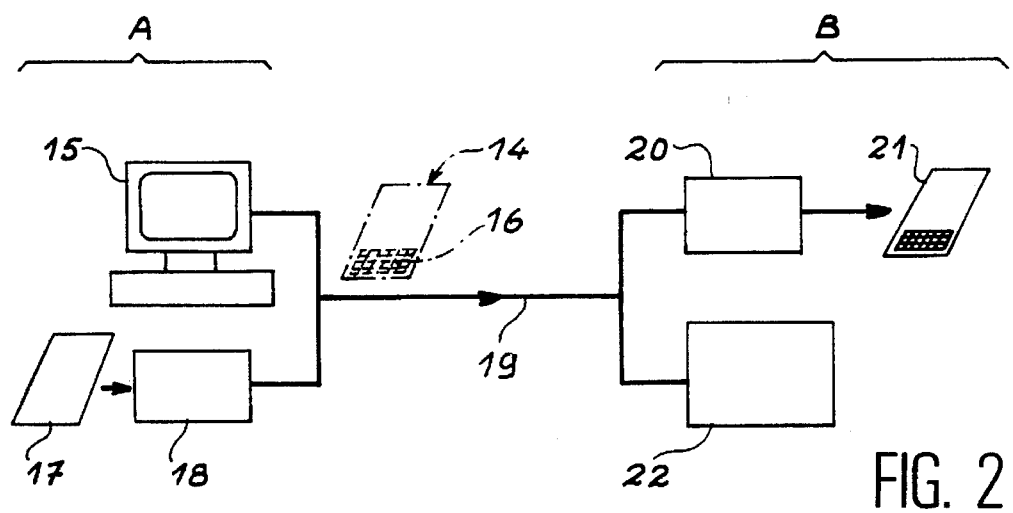
FIG. 2

SECURED APPARATUS AND PROCESS FOR SECURING THE TRANSMISSION OF DOCUMENTS BY FAX AND GRAPHIC CODE FOR THE AUTHENTICATION OF AN IMAGE

BACKGROUND OF THE INVENTION

1. Field of the Invention

The present invention relates to a secured apparatus and to a process for securing the transmission of documents by fax and a graphic code for the authentication of an image.

2. Description of Related Art

The positive points for faxing are simplicity of use, the use of the public telephone network and direct transmission. However, the main negative point is security. As a result of the latter a legal status has not been given to a document transmitted by facsimile or fax.

Most fax machines are in group 3 and do not operate in the error correction mode. These fax machines offer no integrity level. Deterioration can be due to printing, scanning or transmission noise or to deliberate acts of falsification. However, for a transmission by fax, the use of a signature of the exclusively electronic type on a bitmap file (scanned image) for checking the integrity cannot be envisaged. Thus, any transmission error modifies the signature. Moreover, the a posteriori non-repudiation of the document can then only take place if binary files are retained of the faxes received.

When two fax machines are used operating in the character mode, the use of an electronic signature is possible, because transmission then takes place in the error correction mode. However, the checking of the signature must take place manually using an adequate terminal, which constitutes a long and fastidious operation.

The object of the invention is to make more reliable the transmission of documents by fax, so as to prevent any a posteriori repudiation of a document sent. It also aims at permitting the authentication of an image or a document.

SUMMARY OF THE INVENTION

For this purpose the invention relates to an apparatus for the transmission of documents by fax, which, on the emitter side, comprises a securing module placing in the binary file transmitted and representing one page of said document, a graphic signature of the "morse" type including a group of lines formed by series of squares corresponding to a coding of said page, a square of a first color corresponding to a binary "1", while a square of a second color corresponds to a binary "0", the squares of the same line being contiguous, a line space separating two adjacent lines, said group being placed on a page of the document.

This apparatus comprises either a microcomputer, which calculates and positions the graphic signature at the time of the composition of the message, or a fax machine secured with an integrated securing module or a securing box in series on the transmission line.

The security module is integrated into the securing module in order to obtain an electronic signature of the message, which is integrated in the graphic coding. It has a smart card reader able to read a smart card individual to each user, who has a confidential code making it possible to authenticate the latter.

Advantageously, on the recipient side, the apparatus comprises a module for decoding and checking the graphic signature.

The invention also proposes a process for securing the transmission of documents by fax which, on emission, associates with each emitted document page a graphic signature representing it.

This graphic signature is formed from several symbol lines separated by line spaces, the elementary symbol being a square. Any bit of value 1 is represented by an e.g. black square and any bit of value 0 is represented e.g. by a white square, the informations being contiguous. Left and right marks useful during the reading back of the bits are placed at the start and end of the line.

The signature is placed at the bottom of the emitted page or on a supplementary page grouping the graphic signatures of all the pages of the same document.

In order to ensure a high immunity to the noise of the graphic signature, redundancy bits are added to the coded signal making it possible to correct isolated errors during reading. Advantageously use is made of a Hamming code on 127 bits with 7 check bits.

Advantageously, on reception, use is made of an "antinoise" morphological masking making it possible to eliminate on that part of the bitmap file corresponding to the graphic signature, the image faults which have occurred during transmission and/or printing and/or storage (spots, lines, folds, etc.), whose size is smaller than that of the squares.

On reception, the bitmap file of the image is received directly or is obtained from a rescanned sheet in the case of an a posteriori check.

There is a sequential reading of the bits line by line, starting by the first bit top left, the left and right marks added during the formation of the graphic signature making it possible to guide the reading of the bits.

In the case of an a posteriori check, the fax page is printed and the algebraic excess $\epsilon i$ added to each block of identical "0" or "1" is calculated and an incident or fault is detected if:

$$\left| \sum_{i=1}^{3} \epsilon i \right| > 0.6 \text{ and } |\epsilon i| > 0.02$$

On reception, a check is made on the consistency between the bits of the message and the electronic signature bits. This is followed by a check on the consistency between the decoded graphic signature and the image received in plain or uncoded form. On reception, in the case of an a posteriori check, an "elastic" difference is made between the image from the graphic signature and the image received in uncoded form. By associating a graphic signature with each document page faxed, the invention makes it possible to secure said transmission.

Advantageously, the invention makes it possible to ensure the integrity of a document with respect to a third party or "unsecured" recipient. It also permits non-repudiation in emission. Thus, if the recipient stores the document received on paper, the graphic signature proves the origin of the fax. In the same way, any fraud carried out by the recipient on the document received can be detected as a result of the inconsistency between the message and the signature (non-repudiation on reception).

The interest of the invention is to permit the paper storage of secured documents. It is perfectly suitable for the fax exchange of documents. The use of image processing methods makes it possible to associate a graphic signature with any faxed page. This signature guarantees the integrity of the document during its transmission or storage on paper and gives the origin thereof.

According to the invention, the graphic code for authenticating an image comprises a group of lines formed from series of elements of two types corresponding to a coding of said image: an element of a first type corresponding to a binary "1", while an element of the second type corresponds to a binary "0", the elements of the same line being contiguous, a line space separating two adjacent lines and said group being placed at a given location of the image.

Advantageously, the first and second elements are squares having different colors, whereby the first element can be a black square and the second a white square. Each line starts and finishes by left and right marks, which can be formed by two black squares separated from the squares representing the useful bits by a white square.

This code is used in a graphic signature located at a given point of the image. Thus, it can be placed at the bottom of a document page.

Advantageously, the graphic representation according to the invention makes it possible to store more informations than the highly redundant, conventional alphanumeric bar codes.

Thus, it has a smaller size than that of the bar codes both as regards width, but more particularly as regards height. This is due to the fact that the reading back of the graphic zone does not cause the problems encountered in practice for reading back a bar code.

BRIEF DESCRIPTION OF THE DRAWINGS

FIG. 1 illustrates a document page comparing a graphic signature according to the invention.

FIG. 2 illustrates the apparatus according to the invention.

DETAILED DESCRIPTION OF THE PREFERRED EMBODIMENTS

The invention relates to the securing of faxed documents by associating with each transmitted page a graphic signature representing it. This graphic signature is of the "morse" type and has a good immunity to all noise occurring in the case of a fax exchange. It can be placed at a predetermined location of the page in question, for example at in the bottom of the page if this is free, or if not on a supplementary page (called the security page), which groups the graphic signatures of all the pages of the same document. FIG. 1 shows a page 10 of a document having a zone 11 containing the text of the information to be certified and the graphic signature 12.

Thus, the information contained in the faxed page is summarized in a binary file, which can be obtained in two ways:

in the case of a composition on microcomputer, the ASCII codes of the characters typed on the computer keyboard are collected and the codes are then converted into bits;

In the case of an already formed paper fax, the bitmap file of the zone to be certified (message M) resulting from the scanning is compressed in accordance with conventional fax codes, thus supplying a usable binary file.

Thus, in the process according to the invention and as shown in FIG. 2 with respect to the emitter side A. Either the fax 14 is formed from a microcomputer 15, which calculates the position of the graphic signature 16 at the time of the composition of the message. The fax is then supplied directly if the emitter or issuer has a fax emission card or fax add-on card for a microcomputer. If not it is printed and a conventional unsecured fax machine can be used for emission. The fax only contains typed text, logos and/or integrated figures which cannot become part of the zone which is certified and for this purpose direct use is made of the bits of the typed ASCII codes. Or the fax 17 already exists on paper and it is then necessary to use a new generation fax machine 18 with an integrated securing module 19, or to use a securing box in series on the telephone line. The integrated or non-integrated securing module determines and positions in the document bitmap file (file resulting from scanning) the graphic signature of the page. This configuration makes it possible to send any message type (typed text/manuscript, photograph, plan, etc.).

The securing module is included either in the fax machine, or in a separate box, or in the microcomputer. A security module integrated in the securing system makes it possible to obtain an electronic signature of the message, which is incorporated into the graphic coding. This security module has a smart card reader able to read a smart card individual to each user. The user wishing to emit a secured fax must insert his smart card containing its codes in order that it can calculate the signature.

On the receiver side B, any fax machine 20 can be used for obtaining a document 21 corresponding to the document emitted on the transmission line 19. Nevertheless, if the receiver B itself wishes to check the integrity of the document and its origin, it must have a machine containing a securing module. This check can be made at the time of reception, but also a posteriori and in that case the receiver must rescan the paper document which it has retained. If the receiver B does not have a secured fax machine, it can request a server 22 to carry out the integrity check of the document and prove its origin. The receiver then scans the paper page received and transmits the bitmap file by fax to the server. The server has a module for decoding and checking the graphic signature. Another solution for B is to use another fax machine, which is secured.

Deterioration due to the faxed exchange of documents

The exchange of a fax page implies deteriorations or noise effects and different configurations can occur.

On the emitter side A, as described hereinbefore, it is a question of a composition on a microcomputer, where the latter either has a fax add-on card and can directly send the electronic file corresponding to said message on the telephone line, or it does not have one and must print the document on paper, which is scanned by its fax. If it is a document in paper form, it undergoes scanning by the emitting fax prior to despatch.

On the receiver side B, the effects due to transmission noise are common to all configurations. Only said noise occurs in the case of an on line check, because the bitmap file is directly available. For an a posteriori check performed by receiver B, the latter must print the fax at the time of reception, store it and rescan it at the time of the check. For a check performed by a server, it is also necessary for the receiver B to transmit by fax the rescanned document.

The noise due to transmission is limited to a few erroneous adjacent lines on the incoming bitmap file. The scanning noises are shifts, rotations, poor scans, badly contrasted letters, etc. Printing leads to local deformations of the image (ink blots). Paper noise during storage consists of spots of variable size, shape and position. Thus, the bitmap file of a fax page on the receiver side can be significantly deteriorated compared with the initial emitted bitmap file.

The invention makes it possible to use a representation of the fax page which does not vary as a result of the scanning, transmission, storage and printing effects using a graphic coding process for the image which has a high resistance to noise. Use is made of a representation which is easy to read back after transmission and rescanning of the page. The graphic representation in question is of the "morse" type and has a good immunity to all noise occurring in the case of a fax exchange.

Graphic signature zone

If the fax is composed on the microcomputer, it is clear that for positioning the graphic signature of a page it is necessary to reduce the information space. Thus, consideration is given to a zone in which is placed the information to be certified. Advantageously, the bottom of the page is reserved for the positioning of the "morse" zone securing the fax page.

If it is wished to certify an already formed paper fax and the free page bottom is sufficiently high, the graphic signature is placed there. In the opposite case, the graphic signature is placed on a supplementary page (called security page) grouping the graphic signatures of all the pages of a document.

Binary file

The information contained in the fax page is summarized as a binary file, which can be obtained in two ways. In the case of a composition on microcomputer, the ASCII codes of the characters typed on the computer keyboard are collected and are then converted into bits.

In the case of an already formed paper fax, the bitmap file of the zone to be certified (message M) resulting from the scanning is compressed in accordance with conventional fax codes, thus supplying a usable binary file.

Security

Before passing to the actual graphic coding, the security is brought about and it is possible to add to the bits corresponding to the fax page message M, the electronic signature of this message. There is no particular constraint on the electronic signature, because the user can easily supply informations to the receiver concerning the security elements.

The electronic signature of the message M uses informations contained in the message, secret elements stored in a smart card in the possession of the emitter, a random variable (e.g. the time and date to prevent any "replay", the latter being a fraud consisting of reemitting, sometimes without the knowledge of the true emitter, of a document to the same recipient without the latter being able to notice it) and the identity of the emitter. The smart card has a confidential code enabling it to authenticate its legitimate owner. The electronic signature S(M) of the message M obtained by a conventional cryptography process can be checked by the card of the receiver if it is secured.

Graphic coding

The message M and its electronic signature S(M) form a binary series. According to the invention, coding then takes place of each bit of the series in "morse" form, the elementary symbol being a square. Any bit with a value 1 is represented e.g. by a black square and any bit with a value 0 by a square of a different color, e.g. white. The informations are contiguous and there is no space between these two elementary squares. The coded zone is sequentially organized by bits and lines. Left and right marks, useful during the reading back of the bits, are placed at the start and finish of the "morse" line.

The size of a square can e.g. be 1 mm×1 mm. The lines of squares can be separated by line spaces of approximately 0.3 mm. The left and right marks can be formed from two black squares (start bits) separated from the squares representing the useful bits by a white discrimination square.

In order to ensure a high immunity to the noise of the "morse" zone, to the bits of [M,S(M)] are added check or redundancy bits making it possible to correct isolated errors during the reading of the squares. Use can e.g. be made of a Hamming code on N=127 bits with 7 check bits. This zone is incorporated into the bitmap file of the page or document in such a way that it is possible to transmit the file obtained according to the fax protocol.

Decoding

For decoding the reverse process is carried out. The working element is the bitmap file of the image, which is directly received, or is obtained from the rescanned sheet in the case of an a posteriori check.

An "antinoise" morphological masking makes it possible to eliminate on that part of the bitmap file corresponding to the graphic signature, the image faults which have occurred during the transmission and/or printing and/or storage (spots, lines, folds, etc.), whose size is smaller than that of the squares. This is a conventional morphological opening in binary image (erosion followed by morphological expansion), as described in "Précis d'analyse d'images" by Coster and Chermant (publisher). All the image patterns smaller than the symbol size (noise) are "cleaned" by erosion. The expansion makes it possible to restore the shapes which have not disappeared during the first phase.

Once this operation has been carried out, there is a sequential reading of the bits line by line starting with the first bit top left. The left and right marks added during the formation of the graphic signature make it possible to guide the reading of the bits.

In the case of an a posteriori check, the fax page is printed. A disadvantageous noise effect can be brought about by the overflow of certain black squares on white squares. These image deformations lead to the disappearance of bits at 0 (respectively the appearance of excessive bits for 1). To obviate this disadvantage use is made of a procedure based on the algebraic deviation between the number of bits read and the theoretical number of bits, the isolated errors being corrected by the aforementioned check code.

Thus, the local image deformations due to printing lead to a modification of the block lengths, e.g. a block of n bits no longer amounts to n×L (L: length of a bit), but instead n×L+ϵ. If $|\epsilon| \geq L/2$, there can then be n+1 bits or n−1 bits, which can lead to the appearance or disappearance of a bit. To obviate this problem, a calculation is carried out of the algebraic excess ϵ added to each "0" or "1" bit block of an identical nature. In practice, the deformation $\epsilon_2$ undergone by a block is linked with the deformation $\epsilon_1$ of the preceding block and $\epsilon_3$ of the following block. It is then assumed that two successive deformations do not have the same sign. For example, if $\epsilon_2$ is positive (slightly contracted center block), two blocks framing it are slightly expanded or there must be a deformation at $\epsilon_1$ and $\epsilon_3$ with an opposite sign ($\epsilon_1<0$ and $\epsilon_3<0$). When two successive deformations have the same sign, the existence of a printing problem is suspected. A check is then made to see if it is an effective fault and not a minor fluctuation on the values of the deformations.

In order to have a fault, it is e.g. necessary for:

$$\left|\sum_{i=1}^{3} \epsilon_i\right| > 0.6$$

$$|\epsilon_2| > 0.4$$

$$|\epsilon_1| > 0.02$$

It is then necessary to check the consistency between the bits of the message M and the bits of the electronic signature S(M). Thus, the electronic signature calculated by the smart card of the emitter or issuer can be checked by the smart card of the recipient or by the server. In the case of a success, the second stage consists of checking the "graphic" consistency between the decoded "morse" code and the image received in uncoded form with respect to the certified zone. In the case of inconsistency, the fax is considered to be non-integrated.

If it is a composition performed from a microcomputer, on the basis of the bits read in the "morse" zone, the algorithm determines the ASCII codes and gives again the corresponding characters. The receiver B does not necessarily have the type font of the characters used by the emitter and the characters from the graphic signature also appear in a type chosen by B. The recipient or server (a posteriori check) prints or displays on a screen the decoded characters and the operator visually compares them with the message contained in uncoded form on the received fax page. As the graphic coding is bijective, it is possible to mark any integrity defect on the fax by inconsistency between the image and the seal.

In the case of a "morse" zone representing the bitmap file of the page, the binary file M obtained after reading must be decompacted (conventional fax decompacting) to supply the bitmap file of the transmitted image.

Thus, in a compacting operation after reducing the image to a resolution ¼, ¼ (1 pixel on 4 in height, 1 pixel on 4 in width) and while not removing the isolated patterns, using e.g. the JBIG method, the file is compressed by a reversible code used in faxing, namely e.g. the "T4" or "T6" code.

The image received in uncoded form by the recipient is not very noisy in the case of a check on reception or on line, but is very noisy in the case of an a posteriori check. This is due to the printing on paper of the image and its rescanning after storage. Thus, the image from the morse zone and that received do not correspond pixelwise due to deformations and deteriorations caused by noise.

Thus, an e.g. "elastic" difference is formed between the image from the graphic signature and the bitmap file received in uncoded form on paper. This procedure makes it possible to accept local deformations between two images. Only a fraud on the fax text induces a high difference.

Such a difference is based on a dynamic programming algorithm which seeks to minimize the distance between two images, as described in the article by S. Duval, R. Collot and M. Achemial entitled "Comparison of two images by dynamic programming". The procedure thus makes it possible to compare two images of similar shape, the only accepted differences being local deformations and shifts. Thus, with a pixel (i,j) of the first image, the algorithm associates the pixel of the second image belonging to an area round (i,j), so that the distance between the two pixels is at a minimum.

For simplicity reasons, the comparison between two images can be carried out visually by the recipient or the server, who prints or displays on the screen the result of the image contained in the morse zone. The performance characteristics of the eye-brain system enable the operator to reject deformations or minor defects which can be attributed to noise. However, any falsification by a third party (integrity fault) or by a fraudulent recipient (subsequent check) is easy to detect.

The aforementioned server can fulfil an electronic "notary" function consisting of a computer terminal having a fax link. Such a server is necessary if the receiver is not secured to permit an a posteriori check and he then performs archival storage and time stamping functions, while also being able to provide an "acknowledgement of receipt" on the recipient side.

Therefore the invention makes it possible to check the integrity of an image or the like and avoid repudiation of a document received by fax.

Integrity

With regards to integrity, it is possible for a document to undergo abusive modifications during the transmission or storage of the fax on the recipient side. To check the integrity, the bitmap file of the page is available as a digital support (directly for an on line check or obtained after rescanning for an a posteriori check). The morse zone is read, the electronic signature S(M) is checked and then the consistency of the image from the graphic signature with the image received is observed. Any integrity fault on the document received is detected as a result of the non-conformity between the signature S(M) and the message M and/or the non-conformity of the message in uncoded form M and the morse code. For example, the fraudulent recipient B cannot modify the message M and its morse code in a coherent manner. Thus, if he modifies M to M1, he can access the binary series of M1, but cannot obtain the signature S(M1) performed with the secret code of the issuer. In this case the result of the check of the electronic signature is unsatisfactory. This prevents B from accessing the graphic signature corresponding to M1. The symmetrically reverse operation consisting of finding the message M' from a signature S(M') fails for the same reason. Thus, the check algorithm detects any integrity fault of the document. Thus, the analogy with a physical signature placed on a letter is apparent.

Non-repudiation

With regards to the non-repudiation, the situation is that of a delayed check and a storage on paper. The first stage consists of checking the electronic signature S(M) contained in the graphic representation. The identity of the emitter is then proved. There is an analogy with a signature placed on a paper document giving the identity of the issuer. It is then necessary to check the conformity of the binary message M and the signature and the correspondence between the graphic coding and the image received. In the case of a positive result, the issuer cannot repudiate the document presented by the recipient to a legal authority. In the case of a dishonest recipient, who falsifies in his own interests the fax received, the issuer can request a judge to check the integrity of the document presented by the recipient. The check then indicates an inconsistency between the graphic signature and the message. Thus, the recipient is unable to imitate the signature of the issuer.

The interest of the invention is that it makes possible a secure paper storage of documents. The invention is suitable for the fax exchange of documents. The use of image processing procedures makes it possible to associate a graphic signature with any transmitted fax page. This signature guarantees the integrity of the document during its transmission or storage on paper and gives the origin thereof.

Another possible application is the postal computer franking, where a graphic code is then used for franking the envelope.

We claim:

1. Apparatus for the transmission of a document by fax, which, on an emitter side, comprises a securing module placing in a binary file transmitted and representing one page of said document, a graphic signature of the "morse" type including a group of lines formed by a series of squares corresponding to a coding of said page, a square of a first color corresponding to a binary "1", while a square of a second color corresponds to a binary "0", the squares of each line being contiguous, a line space separating two adjacent lines, said group being placed on a page of the document.

2. Apparatus according to claim 1, comprising a microcomputer which calculates and positions the graphic signature at the time of composing a message to be contained on the document.

3. Apparatus according to claim 1, comprising a fax machine secured with an integrated securing module.

4. Apparatus according to claim 1, comprising a fax machine with a securing box in series on the transmission line.

5. Apparatus according to claim 1, wherein a security module is integrated in the securing module to obtain an electronic signature of the message, which is integrated in the graphic coding.

6. Apparatus according to claim 5, wherein the security module has a smart card reader adapted to read a smart card specific to each user and having a confidential code enabling the user to authenticate the smart card.

7. Apparatus according to claim 1, which, on a recipient side, comprises a module for decoding and checking the graphic signature.

8. Process for securing the transmission of documents by fax, wherein, on emission, associating with each emitted document page a graphic signature representing said emitted document page.

9. Process according to claim 8, wherein said graphic signature is formed from several symbol lines separated by line spaces, an elementary symbol being a square, any bit with the value 1 being represented by a square of a given color and any bit with the value 0 being represented by a square of a different color, the informations being contiguous, and left and right marks, useful during reading back of the bits, being placed at a start and end of the line.

10. Process according to claim 1, wherein the signature is placed at a bottom of the page, or on a supplementary page grouping the graphic signatures of all the pages of the document.

11. Process according to claim 8, wherein, in order to ensure a high immunity to noise of the graphic signature, redundancy bits are added to the coded signal permitting correction of isolated errors during reading.

12. Process according to claim 11, wherein use is made of a Hamming code on 127 bits with 7 check bits.

13. Process according to claim 9, wherein, on reception, use is made of an "antinoise" morphological masking to eliminate on that part of the bitmap file corresponding to the graphic signature, the image defects which have occurred during transmission and/or printing and/or storage whose size is smaller than that of the squares.

14. Process according to claim 8, wherein, on reception, a bitmap file of an image is received directly, or is obtained from a rescanned sheet in the case of an a posteriori check.

15. Process according to claim 14, wherein there is a sequential reading of the bits line by line commencing with the first bit top left, the left and right marks added during the formation of the graphic signature making it possible to guide the reading of the bits.

16. Process according to claim 15, wherein, in the case of an a posteriori check, the fax page is printed and a calculation is made of the algebraic excess $\epsilon i$ added to each identical "0" or "1" bit block and a fault is detected if $$\left| \sum_{i=1}^{3} \epsilon i \right| > 0.6 \text{ and } |\epsilon i| > 0.02$$

17. Process according to claim 14, wherein consistency between bits of the message and electronic signature bits is checked.

18. Process according to claim 17, wherein consistency between decoded graphic signature and the image received in uncoded form is checked.

19. Process according to claim 18, wherein, on reception and in the case of an a posteriori check, an "elastic" difference is formed between the image from the graphic signature and the image received in uncoded form.

20. Graphic code for authenticating an image comprising a group of lines formed from a series of squares corresponding to a coding of said image, a square of a first color corresponding to a binary "1", while a square of a second color corresponds to a binary "0", the squares of each line being contiguous, a line space separating two adjacent lines, said group being placed at a given location of the image.

21. Code according to claim 20, wherein the first color is black and the second color is white.

22. Code according to claim 20, wherein each line starts and finishes with left and right marks.

23. Code according to claim 22, wherein the left and right marks are formed from two black squares separated from squares representing useful bits by a white square.

24. Code according to claim 20, wherein the group of lines are located at the bottom of a page of a document.

* * * * *